Dec. 20, 1966    V. SVATY ETAL    3,292,753
GEAR OPERATED CLUTCH AND BRAKE FOR A LOOM
Filed Feb. 9, 1965    2 Sheets-Sheet 1
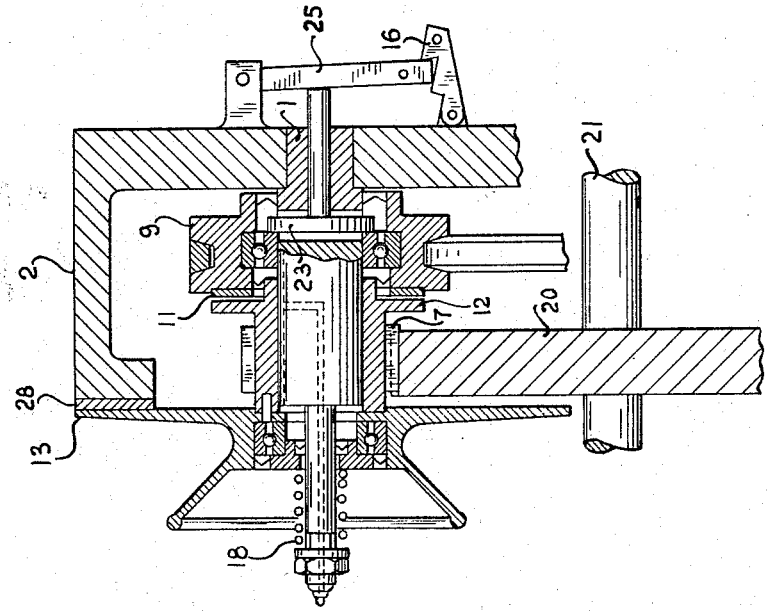
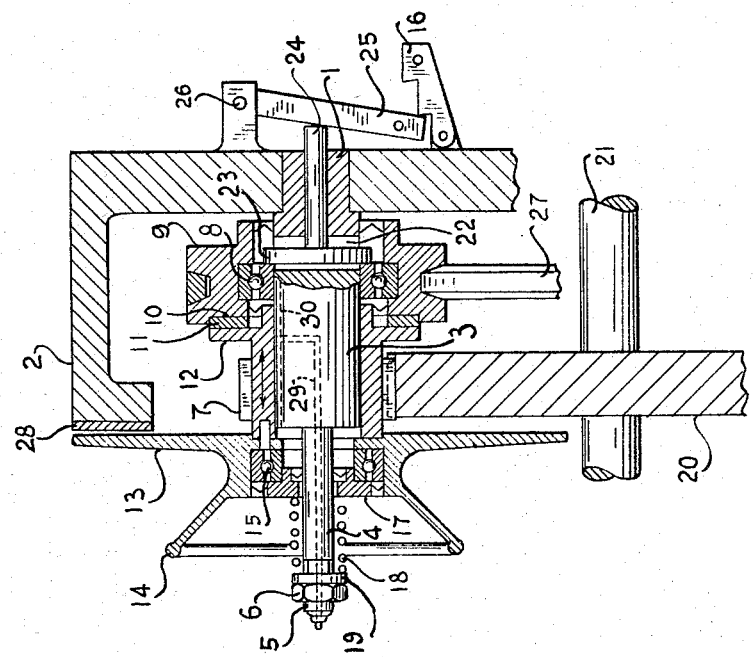
INVENTORS
Vladimir Svaty
Miloslav Otta
Jan Bilek
BY
Michael J. Striker
Atty United States Patent Office 3,292,753
Patented Dec. 20, 1966

3,292,753
GEAR OPERATED CLUTCH AND BRAKE
FOR A LOOM
Vladimir Svaty, 366 Kraluv Haj; Miloslav Otta, 10 Kasparova; and Jan Bilek, 8 Udolni, all of Liberec, Czechoslovakia
Filed Feb. 9, 1965, Ser. No. 432,940
8 Claims. (Cl. 192—18)

The present invention relates to a starting and stopping device for a machine. More particularly, the invention relates to a starting and stopping device for a weaving loom.

The object of the present invention is to provide a new and improved device for starting and stopping machines, particularly high speed weaving looms by means of a frictional disc clutch combined with a brake, which can be used not only for driving, but also for stopping.

High speed weaving looms as well as other kinds of modern high speed machines require safe starting and rapid stopping. With high speed weaving looms, it is particularly important to stop in the most rapid possible manner, because in the case of incorrect insertion of the weft inserting element into the shed the machine must be stopped before the beat-up occurs, otherwise the warp or the machine may be damaged.

In the hitherto known shuttle looms, instantaneous stopping is accomplished by a stopping device which, however, causes undesirable excessive forces to occur in the slay and crank mechanisms.

The newer known shuttleless weaving looms solve the problem of instantaneous stopping by utilizing a highly effective brake which may stop the machine in a few hundredths of a second. The brake, however, is usually of the strap type, which can usually be directly connected with the clutch mechanism only with great difficulty. The control of these brakes is usually independent, so that the machine is complicated and inconvenient for maintenance and operation.

Even frictional disc clutches are known, however, which are used not only for driving, but also for stopping the machine. They are equipped with a driven disc with a friction surface on one side, the friction surface being alternately pressed by a spring either to the friction surface of the driving disc or to the brake ring, the direction and the sense of the pressing force remaining unchanged. The driven disc is mounted on a driven shaft, on which a pinion is mounted as well as the clutch body and the pinion drives the toothed flywheel of the driving mechanism.

A great disadvantage of the known friction disc clutch types, which function simultaneously as brakes, is that it is very difficult and often impossible to adjust the correct starting and braking moment of the machine, especially when it is desirable to select the braking moment as high as possible in relation to the starting moment. Another difficulty is that the control of the entire clutch mechanism, as in the case of using a spring which is too strong, the clutch may be controlled only with great difficulty and on the other hand, when the spring is weak, the strong and rapid braking action necessary for stopping the machine is not available.

The disadvantages of these known driving and braking systems are overcome by the starting and stopping device of the present invention, which permits the use of a weak pressure spring in the driving and braking clutch system for achieving the required force and speed of the braking effect.

The principal feature of the device of the present invention is that the axial forces arising in the helical teeth of the axially movable pinion of the connecting element during braking and starting of the machine is used on one hand for increasing the braking moment during the stopping action and, on the other hand, for diminishing the starting moment of the machine. The basic components of the moments are provided by a unilaterally acting spring and the inclination of the teeth of the axially movable pinion is the basic determining factor for the difference of the magnitudes of both the braking and starting moment, whereas the absolute magnitude of these moments is determined by the pressure of the spring. The axially movable clutch element is provided with a brake disc and is firmly connected by means of a clutch disc with the pinion of the driving mechanism, said pinion having a helical tooth system. This arrangement simplifies the construction of the machine, thereby diminishing its size, simplifying its maintenance and operation and simultaneously lubricating the entire driving mechanism through only one lubrication hole.

In order that the present invention may be readily carried into effect, it will now be described with reference to the accompanying drawings, wherein:

FIG. 1 is a side view, partly in section, of an embodiment of the starting and stopping device of the present in machine driving position;

FIG. 2 is a side view, partly in section, of the embodiment of FIG. 1 in machine braking position;

Figure 3:
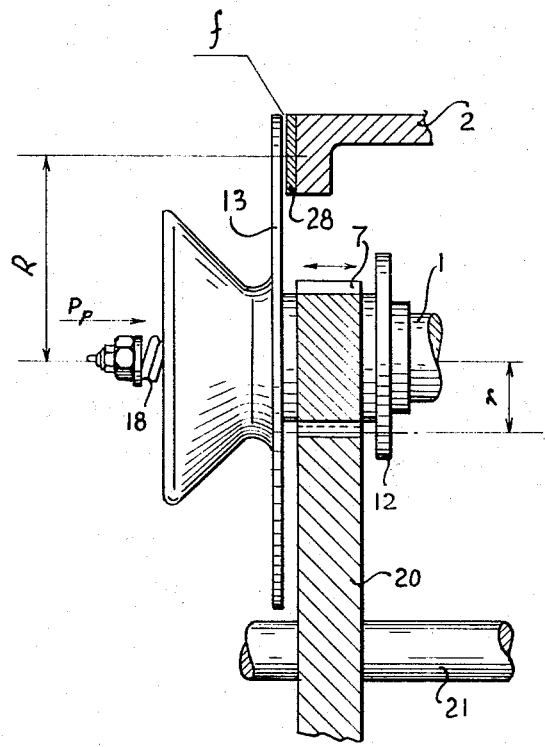
FIG. 3 is a side view, partly in section, of a portion of the embodiment of FIG. 1.

The starting and stopping device or friction clutch of the present invention is mounted on a cylindrical member or pin 1, which is fixed in the frame 2 of the machine. The cylindrical pin 1 is provided with a step or section 3 larger in diameter and ends in a step or section 4 smaller in diameter. The step or section 4 has a thread 5 to which a nut 6 is threadedly coupled.

A pinion 7 with helical teeth and a bearing 8 are mounted in axially movable manner on the step or section 3. A V-belt pulley 9 is mounted on the bearing 8. The pulley 9 is provided with an annular indentation or groove 10 formed in its left side, into which a friction ring 11 is mounted. The friction ring 11 is made, for example, of material used for clutch or brake lining, as the so-called "Ferodo." The pinion 7 is provided on its right side with a clutch disc 12 which bears against the friction ring 11 when the pinion 7 is shifted to the right, as shown in FIG. 1. On the left side, the pinion 7 is firmly connected with the brake disc 13. The brake disc is formed into a hand wheel 14 at its left side. The brake disc 13 is mounted on an axial bearing 15. The bearing 15 is secured in its position in the brake disc 13 by a washer 17 and a helical compression spring 18 bearing against said washer, the left end of the spring 18 being seated against a washer 19 of the nut 6. The pinion 7 is in permanent engagement with a gear 20, mounted on a shaft 21, and provided with corresponding helical teeth.

An opening 22 is provided in the cylindrical pin or member 1 and a pin 23 controlled by a pin 24 is mounted in said opening. The pin 24 is controlled at its right end by a lever 25 which is pivotally mounted on a pivot pin 26 fixed to the frame 2 of the machine. The lever 25 may be controlled either by hand by the operator of the machine or mechanically by a known stopping device (not shown) such as, for example, in looms having a device for stopping the machine in response to the action of a warp or weft stop motion, etc. The pin 23 bears at its left end or side against the bearing 8 supporting the V-belt pulley 9. The pulley 9 is driven by the V-belt 27 from any suitable known driving arrangement (not shown). The lever 25 is secured in its extreme positions by any suitable means such as, for example, a gate 16.

The frame 2 of the machine is provided with an annular brake lining 28 in the area opposite the brake disc 13. The cylindrical pin 1 is provided at its left end with an axial lubrication hole 29, terminating in a surface lubrication groove 30 which runs around the circumferential surface of the step or section 3 thereof, the entire mechanism including the pinion 7 and the bearing 8 being axially movable on said pin and being lubricated via said groove 30.

The device of the present invention operates as follows:

In FIG. 1, the device is shown in the driving position, wherein the lever 25 is deflected to its extreme left position, whereby pressure is exerted by said lever 25 by means of the pin 24 on the vertical pin 23, which displaces, by pressing against the bearing 8, said bearing as well as the V-belt pulley to the left in such a manner that the friction ring 11 presses against the clutch disc 12 of the pinion 7, thereby pressing the brake disc 13, against the force of the helical spring 18, away from the brake lining 28 and coupling the pinion 7 to rotate said pinion by contact with the pinion driving gear 20 and thereby driving the entire machine.

If the machine is to be stopped, either by the operator or by a known mechanical stopping arrangement (not shown) such as, for example, a warp or weft stop motion, the lever 25 is pivoted about the pivot pin 26 from its extreme left position, as shown in FIG. 1, to its extreme right position, as shown in FIG. 2, whereby the pressure of the lever 25 on the pin 24 and on the vertical pin of collar portion 23 is interrupted. The force of the helical spring 18 then moves the brake disc 13 together with the pinion 7, the clutch disc 12, the friction ring 11 and the V-belt pulley 9 to the right, and at the moment that the brake disc 13 abuts the brake lining 28, the machine is almost instantaneously stopped. This simultaneously interrupts the frictional engagement of the clutch disc 12 of the pinion 7 with the friction ring 11 of the V-belt pulley 9, since the necessary gripping force holding the friction ring 11 and the clutch disc 12 in abutment is released.

The helical spring 18 would have to be very strong to alone secure instantaneous stopping of the machine, if the pressure or force of the brake disc 13 on the brake lining 28 were not supported by the axial component of the force of the moment originated during braking, as well as by the inclination of the teeth of the pinion 7 and of the gear 20.

The machine must be started from the braked position, as shown in FIG. 2, so that, although only for a very short time, the pinion 7 is simultaneously in driving engagement and in braking engagement. This is, on the one hand, disadvantageous, because large forces increase the wear of the clutch lining. It is, however, on the other hand, advantageous due to the very rapid reaction of the braking disengagement and due to the braking force being determined by the helical spring 18, which depends only to a very small extent on the wear of the linings 28 and 11.

As hereinbefore stated, the principal problem of stopping the machine, particularly the weaving loom, lies in the required very short time and in the pressure, which must be the greater, the more rapid the required stopping time. In high speed weaving looms, where the machine is required to stop within an interval of time of about 0.02 second, a braking force of several hundred kilograms is required. To achieve this pressure or force, a very strong spring would be required and this would make the control of the clutch during the starting of the machine very difficult. The device of the present invention provides the necessary braking pressure using a relatively weak spring, so that a relatively small force on the starting lever 25 is needed and the wear of the friction ring 11, which must overcome the braked condition of the machine, is also small. The required high braking pressure is provided by the axial component of the force which arises during the braking action due to the helical teeth of the pinion 7, the spring 18 determining its basic value. The braking action is thus very effective, since the pressure or force in the helical spring 18 may be multiplied by a convenient angle of its helical teeth.

Figure 4:
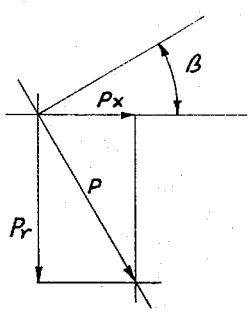
FIG. 4 is a vector diagram of the forces in the helical teeth of the pinion of the embodiment of FIG. 1.

In FIG. 3, the toothed pinion 7 with helical teeth is firmly connected with the braking disc 13 and the clutch disc 12. For braking or increasing the braking moment, the axial component of the force produced by the moment arising during the braking action and by the inclination of the teeth is used. For starting the loom, the opposite effect is used. During the braking action, the force $Pp$ of the spring 18 presses the brake disc 13 against the brake lining 28 and provides the initial braking moment $Mb$. The braking moment is transferred to the pinion gear 7 and the resulting active force P is split up, due to the inclination of the teeth of said pinion, into two components. The two force components are the axial force $Px$ and the radial force $Pr$, as shown in FIG 4. The axial component of the force $Px$, together with the force $Pp$ of the spring 18, produces a higher braking moment. This action is repeated until the machine is stopped.

Theoretically, $Mbv = Mb + Mbx$ $Mb = (p_p)(R)(f)$ $Mbx1 = (px1)(R)(f) = (Pr1)(tg\beta)(R)(f)$
$\qquad\qquad = (Mb)(R/rtg)(f)$ $Mbx2 = (Px2)(R)(f) = (Mb/1)+(R/rtg\beta)(f)$
$\qquad\qquad = (R/rtg\beta)(f)$ etc., where $Mbv$ is the resulting braking moment.

$Mb$ is the braking moment produced by the force of the spring, and $Mbx - \Sigma Mbx1$ is the braking moment caused by the axial component of the force transmitted by the helical teeth of the pinion.

By adaptation, $K = r/(R)(tg\beta)(f)$,

R is the radus of the brake disc,
r is the means radius of the pinion,
f is the coefficient of friction, and
$\beta$ is the angle of inclination of the applied tooth system.

Thus, the expression for the resulting braking moment is $$Mb = Mb + (Mb)(1/K) + (Mb)(1/K^2) + \ldots (Mb)(1/K^n)$$

The expression for the resulting braking moment $Mbv$ represents an arithmetic series. It is advantageous for the technical application that this series be convergent, that is, that the series have a sum, in which case the brake is not self-locking. A divergent series has no sum, in consequence of which the resulting braking moment would increase infinitely and the brake would strike.

From the sum of this series, the final relation is obtained as follows:

$$Mvb/Mb = K/K-1$$

From this relation, it is clear that the value of the braking moment $Mbv$ influences the value of K.

For the given embodiment, the values or magnitudes R, r, f are constant, and thus the value or magnitude of $Mbv$ may be varied in dependence upon the angle of inclination $\beta$ of the teeth.

$$Mbv/Mb = 1/1 - C\ tg\beta$$

where $$C = (R/-r)(f)$$

Figure 5:
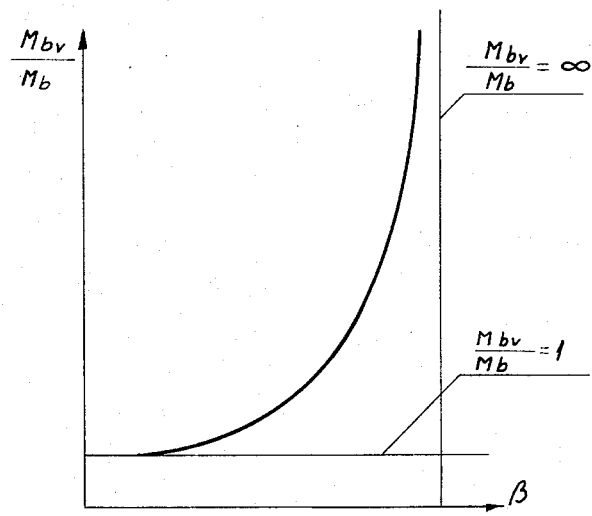
FIG. 5 is a graph of the resulting braking moment of the device of FIG. 1 as a function of the angle of inclination $\beta$ of the pinion teeth.

This function is illustrated in the graph of FIG. 5, in which the ordinate indicates the increase of the braking moment, said increase being caused by the axial component of the force Px, which is produced by the inclined teeth of the pinion 7. The abscissa indicates the angle of inclination β of the teeth. The graph of FIG. 5 shows that the braking effect Mvb/Mb increases exponentially as the magnitude of the angle β increases.

During the starting of the machine the entire operation is reversed. The V-belt pulley 9, which is moved to the left by the movement of the lever 25, produces a frictional force between the friction ring 11, the clutch disc 12 and the pinion 7 and thereby also a coupling moment. The coupling moment acts by means of the helical teeth of the pinion 7 in an opposite sense, that is, against the force provided by the spring 18. It is thus clear that the braking force is much higher than the starting force. However, this is just what is most frequently required of weaving and other machines, where the braking moment must be several times greater in magnitude than the starting moment.

While the invention has been described by means of a specific example and in a specific embodiment, we do not wish to be limited thereto, for obvious modifications will occur to those skilled in the art without departing from the spirit and scope of the invention.

What we claim is:

1. A starting and stopping device for a machine having a frame and brake means supported by said frame, said device comprising, in combination,
   driving means supported by the frame of said machine;
   pinion means rotatably and movably supported by the frame of said machine, said pinion means having substantially helical teeth formed thereon, clutch means affixed thereto and brake means affixed thereto and adapted to cooperate with the brake means of said frame;
   gear means having substantially helical teeth formed thereon in coupling engagement with said pinion means for driving said machine;
   spring means supported by said frame for moving said pinion means in a direction in which said brake means of said pinion means and said frame engage and in which said driving means is disengaged from said clutch means so that said gear means is disengaged from said driving means and is braked; and
   moving means for moving said driving means into engagement with said clutch means and for moving said pinion means against the force of said spring means in a direction in which said brake means of said pinion means and said frame are disengaged so that said driving means drives said gear means, the helical teeth of said pinion and of said gear means producing an axially directed force component and a radially directed force component which during the driving of said gear means decreases the starting moment of said machine and which during the braking of said gear means increases the braking moment of said machine, said starting and braking moments being basically due to the action of said spring means.

2. A starting and stopping device as claimed in claim 1, wherein said spring means is a helical spring.

3. A starting and stopping device as claimed in claim 1, wherein said spring means is a compression spring.

4. A starting and stopping device for a machine having a frame and a brake lining supported by said frame, said device comprising, in combination,
   a substantially cylindrical member having an axis and being fixedly supported by the frame of said machine;
   driving means coaxially mounted on said cylindrical member for rotation and for movement in an axial direction, said driving means having friction material affixed thereto;
   a pinion coaxially mounted on said cylindrical member for rotation and for movement in an axial direction, said pinion having substantially helical teeth formed thereon;
   a clutch disc coaxially affixed to said pinion on said cylindrical member and adapted to contact the friction material affixed to said driving means;
   gear means having substantially helical teeth formed thereon in coupling engagement with said pinion for driving said machine;
   a brake disc coaxially mounted on said cylindrical member and affixed to said pinion for rotation and for movement in an axial direction with said pinion and adapted to contact the brake lining of said frame;
   spring means coaxially mounted on said cylindrical member and urging said brake disc in an axial direction toward the brake lining of said frame; and
   moving means for moving said driving means in a driving axial direction in which the friction material affixed to said driving means contacts the clutch disc affixed to said pinion and the brake disc affixed to said pinion is moved against the force of said spring means out of engagement with the brake lining of said frame so that said driving means drives said gear means through said pinion, and for releasing said driving means so that said spring means moves said brake disc in a braking axial direction into contact with said brake lining and the friction material affixed to said driving means is moved out of engagement with said clutch disc so that said gear means is disengaged from said driving means and is braked, the helical teeth of said pinion and said gear means producing an axially directed force component and a radially directed force component which during the driving of said gear means decreases the starting moment of said machine and which during the braking of said gear means increases the braking moment of said machine, said starting and braking moments being basically due to the action of said spring means.

5. A starting and stopping device as claimed in claim 4, wherein said spring means is a helical compression spring.

6. A starting and stopping device as claimed in claim 4, wherein said driving means comprises a belt-driven pulley.

7. A starting and stopping device as claimed in claim 4, wherein said moving means comprises a pivotally mounted lever and a pin coupling said lever to said driving means.

8. A starting and stopping device as claimed in claim 4, further comprising lubricating means formed in the cylindrical member for lubricating the surface thereof.

References Cited by the Examiner

UNITED STATES PATENTS

| 2,693,322 | 11/1954 | Mercier | 192—204 |
| 2,948,372 | 8/1960 | Goodlaxson | 192—18 |

FOREIGN PATENTS

| 643,679 | 4/1937 | Germany. |

DAVID J. WILLIAMOWSKY, *Primary Examiner.*

B. W. WYCHE, *Assistant Examiner.*